(12) United States Patent
Chase et al.

(10) Patent No.: US 7,433,096 B2
(45) Date of Patent: Oct. 7, 2008

(54) SCANNING DEVICE CALIBRATION SYSTEM AND METHOD

(75) Inventors: Patrick J. Chase, San Diego, CA (US); Craig T. Johnson, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 994 days.

(21) Appl. No.: 10/376,469

(22) Filed: Feb. 28, 2003

(65) Prior Publication Data

US 2004/0169900 A1  Sep. 2, 2004

(51) Int. Cl.
*H04N 1/46* (2006.01)
*G06K 9/00* (2006.01)

(52) U.S. Cl. .................. 358/504; 358/509; 358/318

(58) Field of Classification Search ........... 358/406, 358/504, 474, 475, 525, 1.9, 505, 509, 518, 358/3.23, 534, 536, 513, 516, 538, 510; 382/167, 382/162, 164, 317, 318, 319
See application file for complete search history.

(56) References Cited

U.S. PATENT DOCUMENTS

| | | | |
|---|---|---|---|
| 4,803,556 A | | 2/1989 | Beikirch |
| 5,081,529 A * | | 1/1992 | Collette .................. 358/504 |
| 5,214,518 A | | 5/1993 | Kato |
| 5,278,674 A | | 1/1994 | Webb et al. |
| 5,285,293 A | | 2/1994 | Webb et al. |
| 5,327,171 A * | | 7/1994 | Smith et al. ............... 348/223.1 |
| 5,424,537 A * | | 6/1995 | Lehman et al. ............ 250/235 |
| 5,563,723 A * | | 10/1996 | Beaulieu et al. ........... 358/461 |
| 5,654,809 A | | 8/1997 | Beeman et al. |
| 5,822,052 A | | 10/1998 | Tsai |
| 5,907,742 A * | | 5/1999 | Johnson et al. ............. 399/51 |
| 6,038,038 A | | 3/2000 | Selby et al. |
| 6,417,936 B1* | | 7/2002 | Leberl et al. .............. 358/474 |
| 6,650,416 B2* | | 11/2003 | Tandon et al. ............. 356/420 |
| 7,167,280 B2* | | 1/2007 | Bogdanowicz et al. ..... 358/406 |
| 2005/0134918 A1* | | 6/2005 | Reed ..................... 358/3.01 |
| 2005/0174591 A1* | | 8/2005 | Sowinski et al. .......... 358/1.9 |
| 2007/0146702 A1* | | 6/2007 | Canning et al. ........... 356/336 |

FOREIGN PATENT DOCUMENTS

| | | |
|---|---|---|
| JP | 04-102364 | 4/1992 |
| JP | 07-162681 | 6/1995 |

OTHER PUBLICATIONS

Japanes Patent Office: Office Action for corresponding JP Appl. 2004-050018, issued Feb. 2006.

\* cited by examiner

*Primary Examiner*—Madeleine A Nguyen (57) ABSTRACT

In one embodiment, a scanning device includes a light source configured to selectively illuminate an area of interest and a light sensitive receiver configured to receive light from the light source and generate signals based on the received light. Control logic is configured to power the light source at a power level, generating mid-tone-scan signals at the light sensitive receiver. Calibration logic is configured to determine a calibration factor for a selected pixel based data including the mid-tone-scan signals.

9 Claims, 5 Drawing Sheets

SCANNING DEVICE CALIBRATION SYSTEM AND METHOD

BACKGROUND

Many scanner type devices, from flat-bed scanners to high end photocopiers, use reflected illumination from a light source to generate copies of images. Typically in these devices, the photo-response from pixel to pixel is imperfect. Engineers have developed calibration systems to improve the response and help counter the variability. Traditional calibration systems implement a correction at upper and lower regions of the expected response, typically, at black and at white. Still, banding, streaking, color shifts and other imaging artifacts are often observed in scanned images.

The present invention provides a new and useful method and system for calibrating a scanning device.

BRIEF DESCRIPTION OF THE DRAWINGS

In the accompanying drawings which are incorporated in and constitute a part of the specification, embodiments of a system and method are illustrated which, together with the detailed description given below, serve to describe the example embodiments of the system and method. It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa.

DETAILED DESCRIPTION OF ILLUSTRATED EMBODIMENTS

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Computer-readable medium", as used herein, refers to any medium that participates in directly or indirectly providing signals, instructions and/or data to one or more processors or logic for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Transmission media can also take the form of acoustic or light waves, such as those generated during radio-wave and infra-red data communications, or take the form of one or more groups of signals. Common forms of computer-readable media include, for example, a floppy disk, a flexible disk, a hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, a processor or other electronic device can read. Signals used to propagate instructions or other software over a network, such as the Internet, are also considered a "computer-readable medium."

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

Generally speaking, one embodiment of a system and method is provided for use with a scanning device. The system and method generate scan data and determine calibration values based on the scan data. In one embodiment, the system is configured to calculate calibration values by interpolating between selected scan data and known and calculated target values. Other embodiments and features are described in more detail in the following examples.

Figure 1:
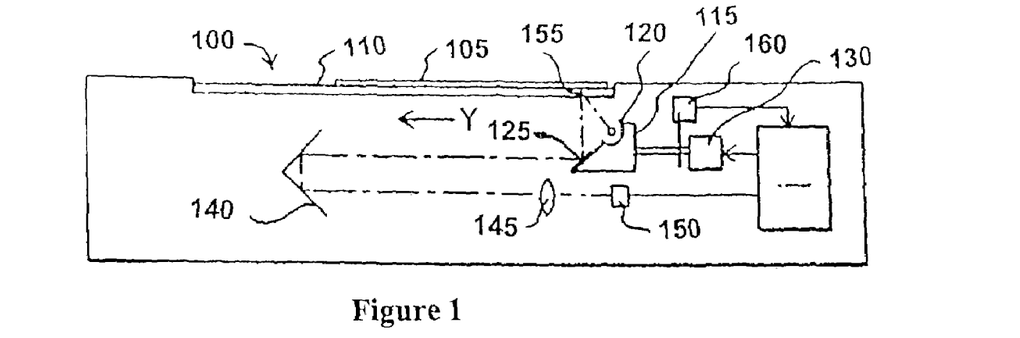
FIG. 1 is one embodiment of a scanning device.

With reference to FIG. 1, a scanning device such as flat bed scanner 100 may include a document 105 positioned on transparent platen 110 with an image facing downward. In operation, the image is scanned or converted into a signal useable by image processing logic and the like.

In the illustrated embodiment, the scanning process is accomplished by a movable carriage 115 that contains a light source 120 and a reflecting mirror 125. Motor 130 is mechanically coupled to carriage 115, as by gears, cables or the like, to move carriage 115 in the Y direction, along the length of platen 110. The light reflected from the document is redirected by a mirror 140 into lens 145 and thence into light sensitive receiver 150. The mirror 140 may be mounted for movement concurrently with carriage 115, but at one half the velocity of carriage 115, so that the optical path from the object plane of scan line of light 155 to the image plane of light sensitive receiver 150 is maintained constant in length. Those skilled in the art will appreciate that alternative, non-illustrated, embodiments can include contact image sensors (CIS) that do not require the moving mirror illustrated and enables scanning function with fewer components. Regardless of individual components, the transmission vehicle from light source to receiver is designated "optical path."

Figure 2:
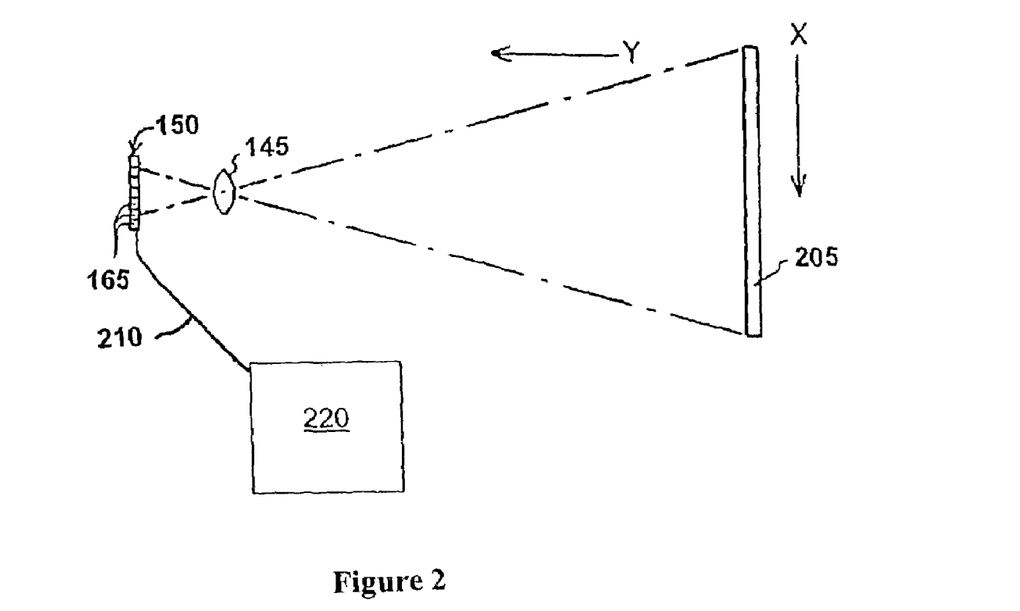
FIG. 2 is one embodiment of a scanning device optics.

With reference to FIG. 2, one embodiment of the light sensitive receiver 150 is shown that includes a charge coupled device (CCD) configured as a linear serial array of discrete light sensor cells or light detector cells 165. Each sensor cell 165 of sensor array 150 defines a document picture element (PEL). For instance, CCDs which can distinguish 400 PEL cells per inch on the document provide serviceable resolution, and are readily available from commercial sources. Those skilled will appreciate that the light sensitive receiver 150 can alternatively comprise other devices capable of converting optical energy into signals such as photodiodes or other CMOS detectors.

With reference again to FIG. 1, light source 120 may be constructed and arranged to produce a line of light 155, or a linear footprint or zone of light, on a desired area such as platen 110 or a calibration target (not shown). Line of light 155 extends in the X (FIG. 2) direction relative to document 105. The line of light 155 defines a row of document PELS. As line 155 moves in the Y direction, the signals are generated representing the document as a number of parallel rows, each row being a number of document PELS in length. Light source 120 can include a single light with colored filters (e.g. red, green and blue) or banks of colored light emitting diodes.

In FIG. 2, a typical 8.5 inch long image scan line 205 can be optically reduced in length as it passes through lens 145 in a ratio of, for example, about 7.7:1 before reaching light sensitive receiver 150. Alternative embodiments do not necessarily employ optical reduction and, as known, others such as 1:1 systems, for example a CIS scanner system are substitutable with no loss of functionality. Note that light sensitive receiver 150 also is positioned in the area above defined X direction relative to document 105. In other words, receiver 150 is offset from the platen 110.

In one embodiment, the signal 210 generated by light sensitive receiver 150 is an analog signal. The signal 210 is periodically read row by row, as carriage 115 moves in the Y direction relative to the platen 110. The output scan signals 210 from the individual cells of sensor ray 150 are coupled to control logic 220 where the signals are converted to digital signals. Control logic 220 introduces drive signals to motor 130, and may also receive position or movement feedback information relative to carriage 115 and/or mirror 140, such as from the output of a tachometer position detector 160 and from a carriage home position sensor (not shown). As further described below, control logic 220 can be configured to power light source 120 in accordance with a calibration sequence.

Figure 3:
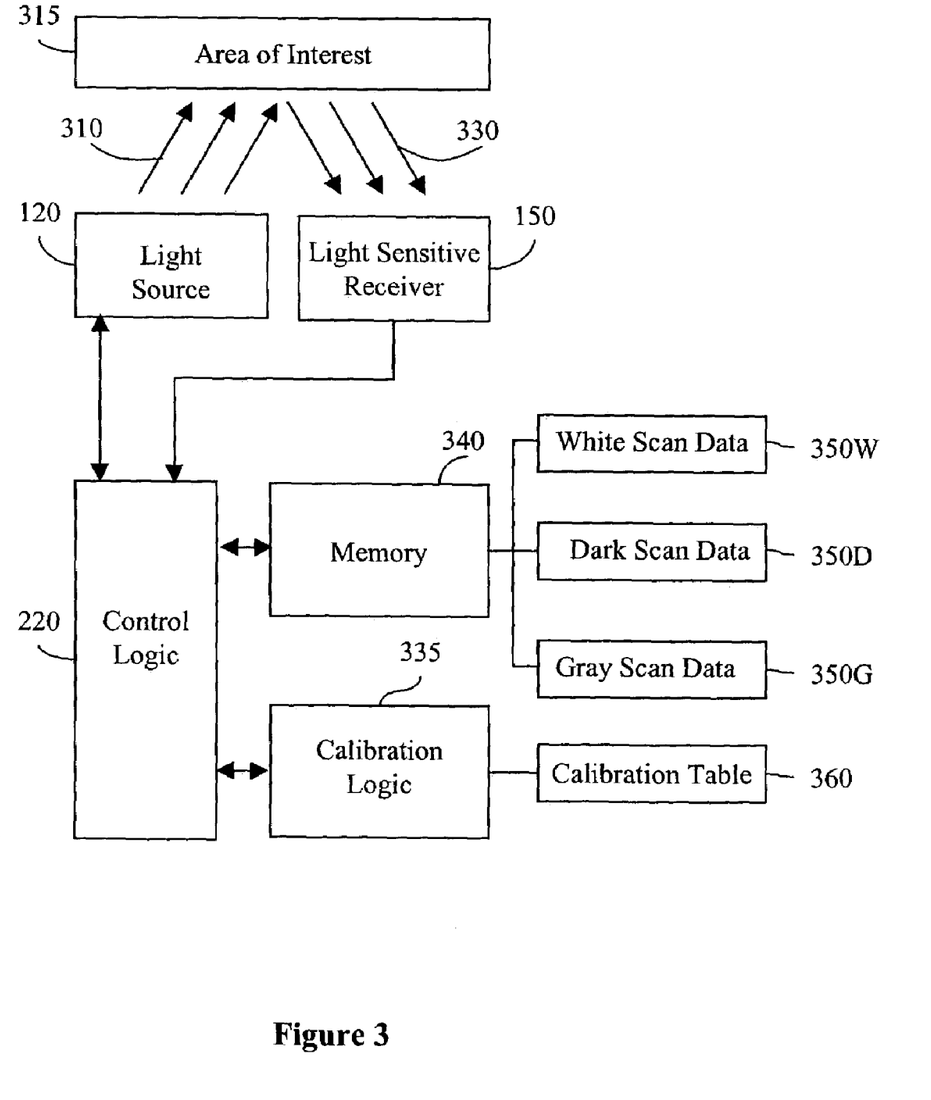
FIG. 3 is one embodiment of a scanning device.

With reference now to FIG. 3, in one embodiment, a calibration sequence comprises obtaining calibration values for each of a white scan, a dark or black scan, and a gray scan. Gray values may alternately be referenced as mid-tone values representing their placement between the two extremes of black and white. Additionally, while the disclosure employs the terms black, white and gray, those skilled in the art will appreciate applicability to color processes and color scanning devices as well. Indeed, the relation of gray processing to color processing is within the skill of a color engineer. In this case, control logic 220 receives or generates a triggering event initiating calibration. The control logic 220 is configured to control the illumination power of a light source 120. For example, the control logic 220 can cause the light source 120 to operate at any desired level between no power (e.g. no illumination) to full power (i.e. full illumination used during a scan). Intermediate levels of illumination are obtained by application of intermediate levels of power. Non-linearities in various light sources typically result in observed illumination differing or offset from the power level supplied. As used herein, the intermediate or approximate power level is understood to produce intermediate or approximate illumination.

To receive white scan data, the control logic 220 operatively communicates with the light source 120 which applies full illumination power. Illuminating light 310 then illuminates an area of interest 315. The area of interest 315 in the calibration sequence may be a calibration target such as a strip or other object disposed outside the field of view of the platen (not shown) in a flat bed scanner. Alternately other scanning devices such as copy machines, facsimile machines, scroll fed scanners and the like may employ an area of interest such as the background of the scanned image to calibrate upon.

As the calibration scan progresses over the area of interest 315, signals representative of white scan data are obtained by taking periodic readings from a light sensitive receiver or detector that detects reflected light 330. These signals are generated in response to the light sensitive receiver 150 receiving the reflected light 330 from the area of interest 315. The signals may be communicated to a calibration logic 335 via the control logic 220 and digitized if needed. As will be further discussed below, calibration logic 335 receives scan data from several scans 350, generates and stores calibration factors in a memory 340 or other computer-readable medium for later use.

In a system with a single white target area of interest 315, that is a system without a black or gray target, a dark scan 350D is obtained by taking readings from the light sensitive receiver 150 while the light source 120 is not powered or "dark." Alternately, in systems where a black target is included in the area of interest (not shown) a black scan is obtained by scanning the black target under full illumination of the light source. For purposes here, black scan and dark scan interchangably refer to a scan to obtain response values at the dark end of the light spectrum, that is, as opposed to the white scan.

The calibration sequence also includes at least one gray scan 350G obtained by taking readings from the light sensitive receiver 150 while the light source 120 is partially powered or otherwise not producing full illumination intensity. Where two gray scans are desired, the control logic 220 can communicate with the light source 120 to perform two scans of a monochromatic, white, area of interest 315 each at different illumination levels or intensities. Alternately, where the area of interest 315 contains gray or intermediate areas or strips, other calibration scenarios can effectively yield multiple gray scans.

Figure 4:
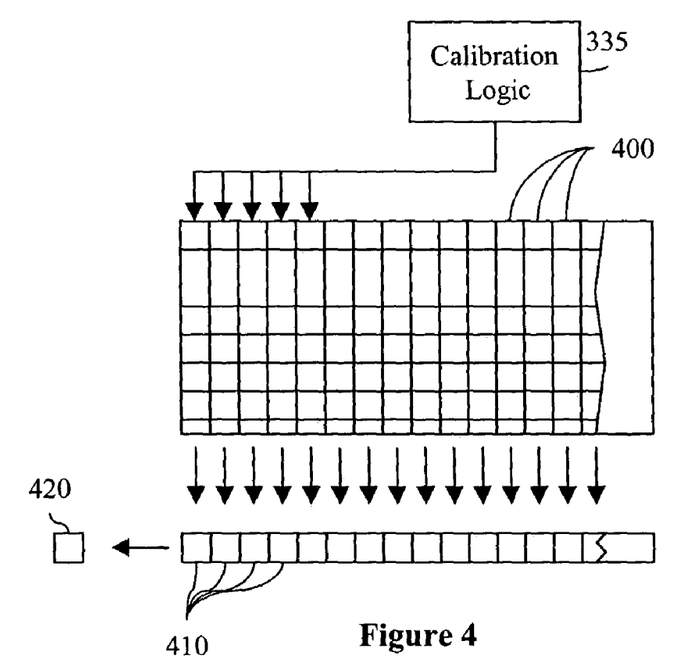
FIG. 4 is a stylized illustration of one embodiment of calibration logic.

With reference now to FIG. 4, calibration logic 335 is configured to receive the signals from each of the calibration scans. For example, calibration logic 335 is illustrated as storing scan rows sequentially with like PEL positions aligning with each other to form columns 400. After a scan completes, the values in each column are averaged resulting in an average column value 410 for each column 400. Further processing averages the average column values 410 across the scan line resulting in a single calibration value 420 for each calibration scan. It will be appreciate that not necessarily all data in columns will be used. For example, corrupted data or samples lying outside of particular thresholds may be discarded. Additionally, numerical manipulations other than simple averaging are possible.

Figure 5:
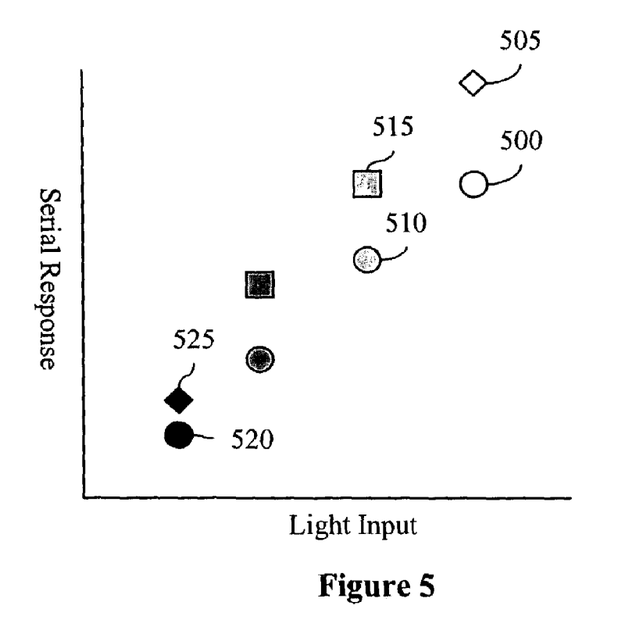
FIG. 5 is a graph depicting variables and known values used in one embodiment of calibration logic.

Continuing with the present illustration and referring now to FIG. 5, the set of calibration scans result in one white-scan value 500, at least one gray-scan value 510, and one dark-scan value 520. To further differentiate, scan values are illustrated by circles. In the instant example, the system has predetermined target values for white and dark such as white target value 505 and dark target value 525. Again, to differentiate, predetermined target values are illustrated by diamonds. However, due to uncertainties in intermediate power settings, the control logic 220 may not know the exact illumination intensity of the light source, and the resultant gray, a target gray data 515 is unknown. Target gray value 515 can be calculated, however, from the known values—in this case, calibration scan data 500, 510, 520 and known white and dark targets 505, 525. Calculated target values are illustrated by squares. One method of calculating the target gray value 515 is by interpolating between the known values.

Once the target gray value 515 is calculated, calibration logic 335 calculates a linear fit off-set plus gain that will adjust each pixel from the averages for their respective columns 400 in gray and black scan to the target values for gray and black 515, 525. It is appreciated that the calibration logic 335 can have two measurements, two targets, and two degrees of freedom, namely off-set and a gain. This process produces a table of off-sets and gains called the photo response non-uniformity correction table which is stored in calibration table 360 and applied on the fly to an image created during use of the scanning device 100.

To illustrate one embodiment, assume two pixels exist on a scan line. Further assume that the response of the first pixel is a straight line from white to black, meaning upon illumination using half the light intensity, that pixel responds with half the signal out. Assume the second pixel on the scan line has a slightly nonlinear response, so that upon illumination using half the light intensity, that pixel responds with a signal out slightly different than a half value, such as 0.6. This embodiment calibrates in gray, without a gray target strip, and without control over or knowledge of exactly how much illumination is present in the gray calibration. When complete, the same average response in white exists as under previous methods because the target can be derived by interpolating among those averages. Indeed, the variability can be suppressed at the tone of that gray scan because it is used to calculate the pixel gains and off-sets. Continuing with the illustration, the result is that both pixels are calibrated to respond at 0.55 with an input intensity of 0.5 because of the calibration.

Figure 6:
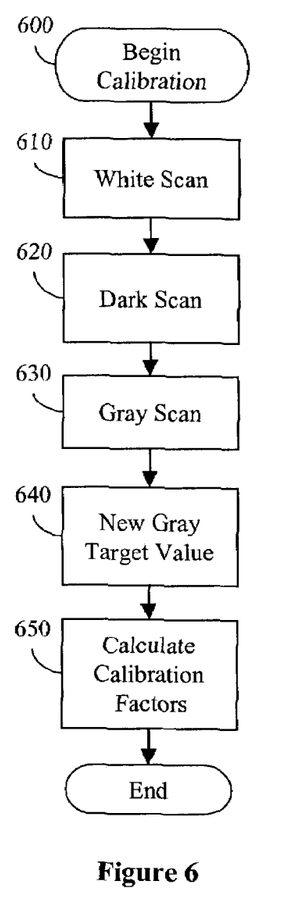
FIG. 6 is one embodiment of a calibration methodology.

With reference now to FIG. 6, one embodiment of a calibration methodology is shown. The calibration may begin with a triggering event (block 600). A white scan is performed and a white scan average value, such as value 500, is obtained (block 610). As discussed above, the white calibration scan is conducted with the light source at maximum or full illumination as would be used in a working scan. A dark scan is performed and a dark scan average value is calculated, such as value 520 (block 620). The dark scan may alternately be obtained by conducting a no-illumination scan of a white calibration target, or a full illumination scan of a black calibration target. A gray scan is performed and a gray scan average value 510 (block 630). The gray scan may alternately be obtained by conducting a full illumination scan of a gray calibration target, or a partial illumination scan of a white or black calibration target. Using the data obtained from the scans, a target gray value, such as gray value 515, is derived (block 640). In one embodiment, the target gray value 515 can be obtained according to the following equation:

$$\text{gray\_tgt}(515) = \text{dark\_tgt}(525) + (\text{white\_tgt}(505) - \text{dark\_tgt}(525)) * (\text{gray\_avg}(510) - \text{dark\_avg}(520)) / (\text{white\_avg}(500) - \text{dark\_avg}(520)) \quad \text{EQ. 1.}$$

Calibration factors are then calculated for each pixel (block 650). The calibration factors can be restored in a table or other desired data structure. In one embodiment, the calibration factors are gain and offset and are calculated according to the following equations:

$$\text{Pixel\_gain}(x) = \text{gray\_tgt}/(\text{pixel\_value\_in\_gray\_scan}(x)) \quad \text{EQ. 2.}$$

$$\text{Pixel\_offset}(x) = \text{pixel\_value\_in\_dark\_scan}(x) - \text{dark\_tgt} \quad \text{EQ. 3.}$$

Figure 7:
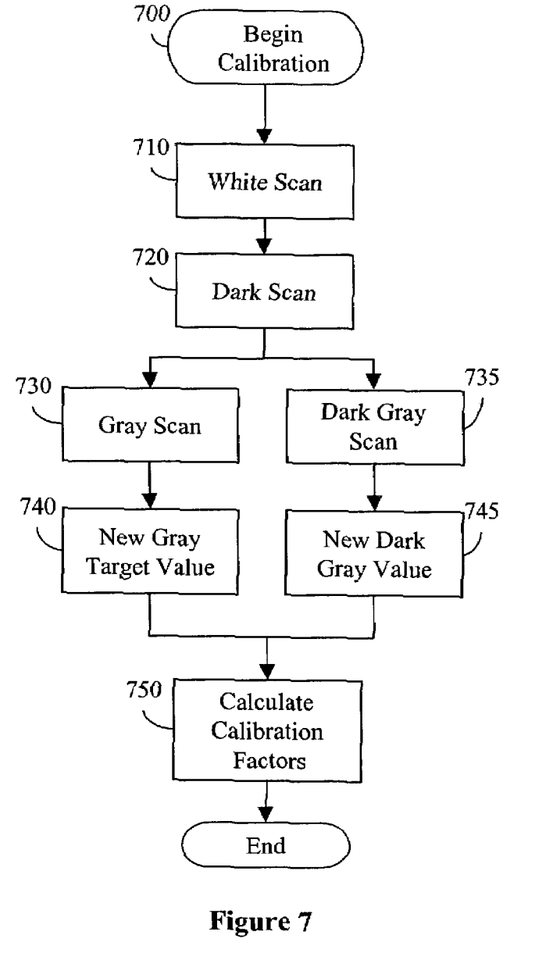
FIG. 7 is another embodiment of a calibration methodology.

With reference now to FIG. 7, another embodiment of a calibration methodology is shown. After the calibration begins (block 700), a white scan is performed and a white scan average value, such as value 500, is obtained (block 710). A dark scan is performed, yielding a dark scan average value, such as value 520, (block 720). A gray scan is performed, yielding a gray scan average value, such as value 510, (block 730). Using the data obtained from the scans, a target gray value, such as value 515, is derived (block 740). In one embodiment, the target gray value 515 is obtained according to the equation 1 above.

A dark gray scan can also be performed, yielding a dark gray scan average value (block 735). Here, the light source is controlled to illuminate the area of interest at a power or intensity level less than the power level used for the gray scan (block 730) but greater than the power level used for the dark scan (block 720). Using the data obtained from the scans, a target dark gray value is derived (block 745). In one embodiment, the target dark gray value is derived according to the following equation:

$$\text{dark\_gray\_tgt} = \text{dark\_tgt}(525) + (\text{white\_tgt}(505) - \text{dark\_tgt}(525)) * (\text{dark\_gray\_avg} - \text{dark\_avg}(520)) / (\text{white\_avg}(500) - \text{dark\_avg}(520)) \quad \text{EQ. 4.}$$

Calibration factors are then calculated for each pixel (block 750). In one embodiment, the calibration factors are gain and offset values and are calculated according to the following equations:

$$\text{Pixel\_gain}(x) = \text{gray\_tgt}/(\text{pixel\_value\_in\_gray\_scan}(x)) \quad \text{EQ. 5.}$$

$$\text{Pixel\_offset}(x) = \text{pixel\_value\_in\_dark\_gray\_scan}(x) - \text{dark\_gray\_tgt} \quad \text{EQ. 6.}$$

In a color embodiment of the calibration factors, the process is repeated for each color component. Note values for each color component (e.g. RGB) can be different. In other words, pixel gain for red can be different from the same pixel gain in green.

Figure 8:
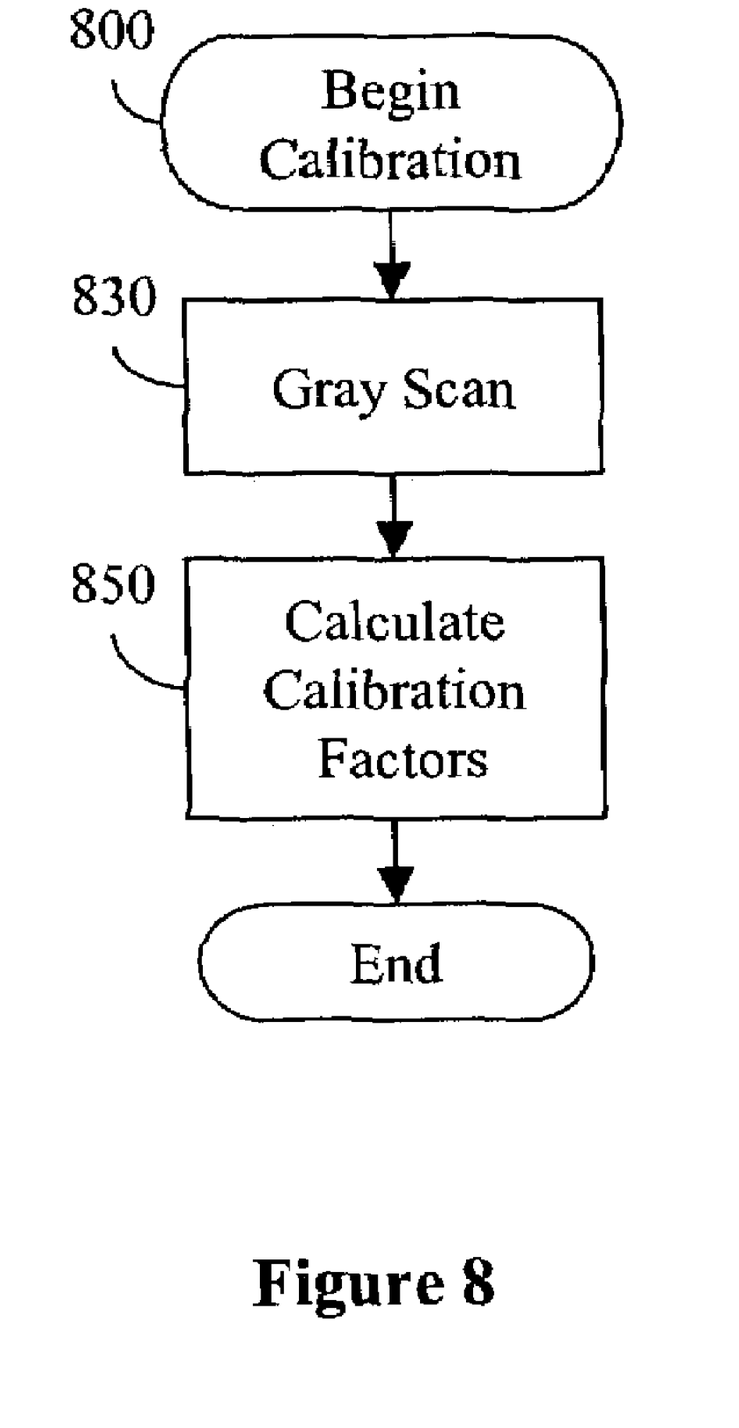
FIG. 8 is another embodiment of a calibration methodology.

With reference now to FIG. 8, an alternate embodiment of a calibration methodology is shown. After the calibration begins (block 800), a gray scan is performed, yielding a gray scan average value, (block 830). At least one calibration factor is then calculated for each pixel (block 850). In one embodiment, the calibration factor is merely gain, and any offset is discarded or not applied.

After calibration factors are calculated and stored, they may be applied in run time on a working scan. Details are noted in U.S. Pat. No. 5,285,293 issued Feb. 8, 1994 to Webb et al. and incorporated here by reference. The compensation to a working scan in one embodiment is accomplished according to the following equation:

Compensated_pixel_value(x)=scanned_pixel_value(x)
*pixel_gain(x)−pixel_offset(x)  EQ. 7

Where calibration factors pixel_gain(x), and pixel_offset (x) are retrieved from the calibration table 360.

Those skilled in the art can now appreciate that alternate embodiments are readily obtainable. For example, while control logic 220 and calibration logic 335, are illustrated as separate, but connected devices, they could alternately reside on the same physical device segregated by address, partitioned, or otherwise identifiable to the logic accessing them. The illustrated logic and elements, represented as distinct components, can be configured together or separated with no loss of functionality. Further, various logical distinctions have been illustrated for clarity but actually need not be so distinct. Moreover, while certain elements have been illustrated and claimed in particular orders, such order is not intended as limiting. For example, often a calibration sequence has been discussed as proceeding from white scan, to dark scan to gray scan. This ordering may be changed. Also, the number of steps or the particular processes discussed or illustrated are not intended as limiting, but merely to illustrate the features and components of the appended claims.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A scanning device comprising:
   a light source configured to selectively illuminate an area of interest;
   a light sensitive receiver configured to receive light from the area of interest and generate signals based on the received light;
   control logic configured to power the light source at at least one power level to generate a measured signal at the light sensitive receiver corresponding to at least one known target value, and to power the light source at at least one approximate power level being a partially powered level to generate a second measured signal at the light sensitive receiver corresponding to at least one approximate target value; and
   calibration logic configured to determine a calibration factor for a selected pixel based on at least the known target value and the approximate target value;
   where the control logic is configured to power the light source at a second approximate power level different front the one approximate power level, the light source powered at the second approximate power level to generate a second approximate target value at the light sensitive receiver.

2. The scanning device as set forth in claim 1, where the calibration logic is configured to calculate an offset and gain for a pixel, the calibration factor for the selected pixel comprising the calculated offset and gain.

3. The scanning device as set forth in claim 2, where the calibration logic is configured to calculate the offset and gain by fitting between a target value and a measured pixel value.

4. The scanning device as set forth in claim 1, where the calibration logic is configured to determine the calibration factor for the selected pixel based on at least the known target value, the approximate target value, and the second approximate target value.

5. The scanning device as set forth in claim 1, further comprising a monochromatic target outside of an imaging area, wherein the control logic is configured to cause illumination of the monochromatic target and generation of the measured signal, and to cause illumination of the monochromatic target to be less than the light source at the first power and generate gray scan signals at the light sensitive receiver.

6. The scanning device as set forth in claim 4, where the light source at less than the first power is substantially non-illuminated.

7. The scanning device as set forth in claim 1, further comprising a multi-chromatic target where the light source at the first power illuminates a first portion of the multi-chromatic target and where the light source at a second power illuminates a second portion of the multi-chromatic target.

8. The scanning device as set forth in claim 1 where the least one approximate power level is a partially powered level.

9. The scanning device as set forth in claim 8 where the partially powered level is between a full-illumination intensity and a no-illumination intensity.

* * * * *

UNITED STATES PATENT AND TRADEMARK OFFICE
CERTIFICATE OF CORRECTION

PATENT NO. : 7,433,096 B2  Page 1 of 1
APPLICATION NO. : 10/376469
DATED : October 7, 2008
INVENTOR(S) : Patrick J. Chase et al.

It is certified that error appears in the above-identified patent and that said Letters Patent is hereby corrected as shown below:

In column 3, line 47, delete "ray" and insert -- array --, therefor.

In column 3, line 55, insert -- the -- before "light".

In column 8, line 9, in Claim 1, delete "front" and insert -- from --, therefor.

In column 8, line 32, in Claim 6, delete "claim 4" and insert -- claim 5 --, therefor.

Signed and Sealed this

Third Day of March, 2009

JOHN DOLL
*Acting Director of the United States Patent and Trademark Office*